Jan. 23, 1934.　　　J. W. SMITH　　　1,944,766
SPRING CONNECTION
Filed Dec. 4, 1930

INVENTOR
John W. Smith
BY
ATTORNEYS.

Patented Jan. 23, 1934

1,944,766

UNITED STATES PATENT OFFICE 1,944,766

SPRING CONNECTION

John W. Smith, New Britain, Conn., assignor to The Fafnir Bearing Company, New Britain, Conn., a corporation of Connecticut Application December 4, 1930. Serial No. 499,924

4 Claims. (Cl. 267—54)

My invention relates to a spring connection, and more particularly to a spring shackle.

It is the general object of the invention to provide an improved spring connection of sturdy construction, involving relatively few parts, easy to manufacture and assemble, and which is not likely to get out of order.

It is a more specific object to provide a spring shackle construction wherein the shackle links are spaced apart by the bearing raceway parts and secured together substantially concentrically with said bearing parts. Other objects will become apparent or will be pointed out hereinafter.

Briefly stated, in a preferred form of the invention, I provide bearing members which may be shackle links having raceways for anti-friction bearing devices. Means such as tubular pins or the like are interposed between the shackle links and serve to space the same apart. Anti-friction bearing devices are interposed between the bearing members and tubular means for taking radial loads. Suitable devices such as through bolts serve to hold the bearing members to each other so spaced apart. Resilient means such as spring washers or the like may serve to resiliently hold the bearing members to each other.

In the drawing which shows, for illustrative purposes only, preferred forms of the invention—

Figure 1:
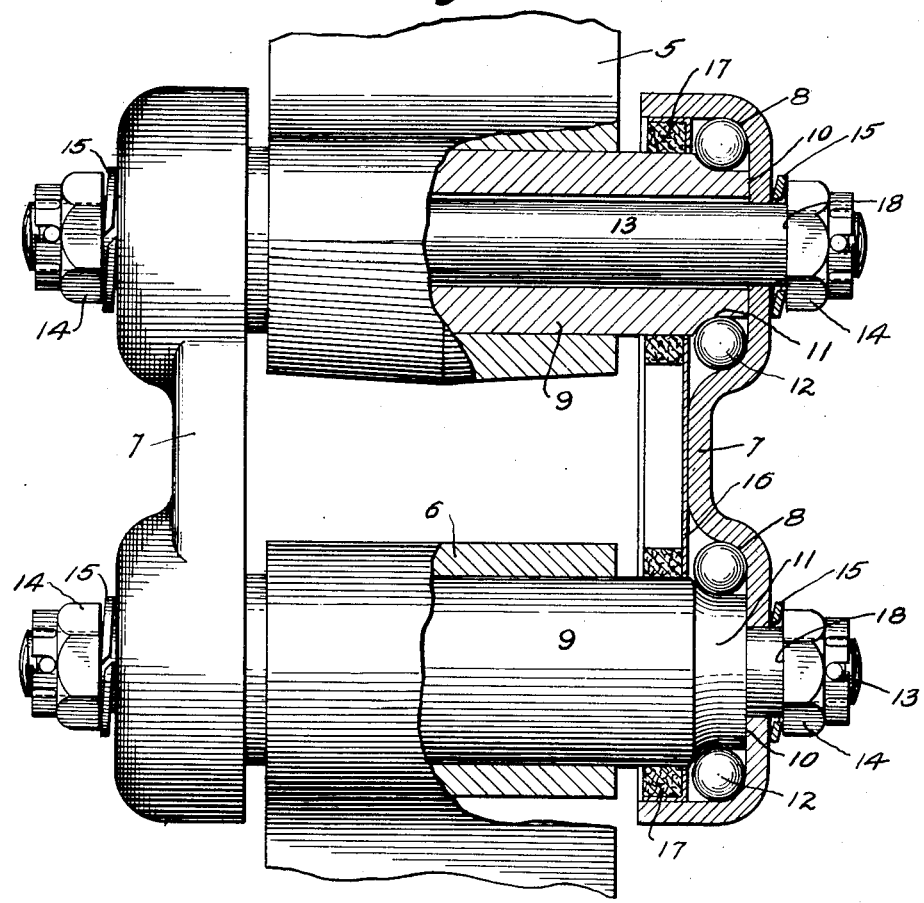
Fig. 1 is a view in partial section of a complete shackle construction securing a spring and frame to each other.

In said drawing, 5 indicates one of the connected members, such as a vehicle frame, while 6 indicates the other connected member such as a spring. When the invention is embodied in a shackle as herein disclosed, I provide a pair of shackle links 7—7 which may be formed of sheet metal pressed into the proper form so as to provide bearing raceways 8—8 at spaced points thereon. Tubular means which in the form shown are hollow bearing pins 9—9 are securely carried by the spring and frame. As illustrated in Fig. 1, the bearing pins 9—9 engage the shackle links directly as indicated at 10—10 for definitely spacing the links apart. The bearing pins 9—9 are provided with raceways which may be formed directly upon the sides of the pin ends as indicated at 11—11. Anti-friction bearing devices such as balls 12—12 are interposed between the raceways of the shackle links and the raceways on the bearing members 9—9. The links are connected to each other so spaced apart by said bearing members 9—9 preferably by through bolts 13—13 having nuts 14—14 or a head and a nut. In order to provide a more resilient construction permitting a slight teetering of the pins 9—9 relatively to the links, I may employ one or more spring washers such as 15 on the bolts 13 so that the links are resiliently held in engagement with the combined bearing and spacing members 9—9. The nuts 14 when screwed up may abut shoulders 18 on the bolts 13 so that a mechanic cannot unduly cramp the parts and the links will be held together by the stressed spring washers 15.

Each link may be provided with a sheet metal seal plate 16 carrying sealing means such as felt washers 17—17 engaging the bearing members 9—9 so as to exclude dust and retain lubricant on the anti-friction bearing members. It is to be understood that before assembly the space about the balls 12—12 is filled with a suitable grease which is retained by the sealing plate 16 and felt washers 17.

Figure 2:
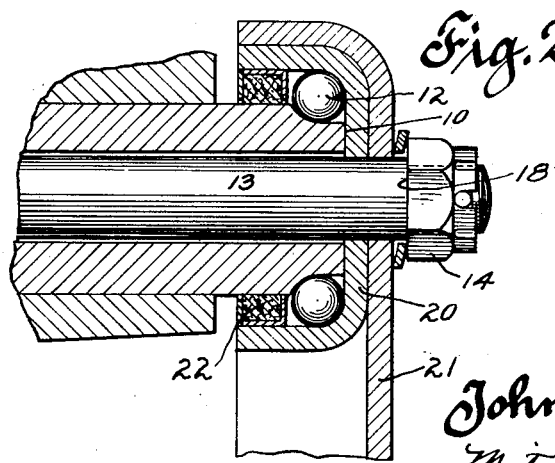
Fig. 2 is a fragmentary sectional view of a modified form of construction.

In the slight modification shown in Fig. 2, the raceways of the shackle links, instead of being formed directly thereon as indicated at 8—8 in Fig. 1, are formed in a separate bearing cup 20 carried in a suitable depression in the link 21. Individual seal members 22 are carried by the cup members 20 so as to exclude dust and retain lubricant as heretofore described. The construction, operation, and mode of assembly of the form shown in Fig. 2 is substantially the same as that shown in Fig. 1.

It will be seen that by means of my construction the hollow means and bearing means, which may be through pins 9, serve not only as bearing members but also as spacing members for the shackle links as well. Due to the slight teetering of the links relatively to the ends of the pins 9—9, lubricant may get between the pin ends and the links and thus properly lubricate the engaging surfaces so as to prevent any tendency to squeak.

In a construction such as that shown, the raceways are designed so that the balls take radial loads while the end thrust between the links and bearing pins 9—9 are taken by the latter.

By having the links connected to each other by means concentric with the raceways, there is a very secure holding of the links to each other and there is little tendency to any springing of the links or for any of the parts to get out of order. The construction involves relatively few parts and which are of simple form providing a sturdy spring connection not likely to get out of order.

While the invention has been described in considerable detail and as embodied in a shackle, it is to be understood that it may be otherwise embodied and that various changes, additions, and omissions may be made within the scope of the invention as defined in the appended claims.

I claim:

1. In a spring shackle construction, a pair of shackle links having raceways for anti-friction bearing devices at spaced points thereon, tubular means to be carried by a spring, tubular means to be carried by a frame, said tubular means having raceways for anti-friction bearing devices complementary to said first mentioned raceways, anti-friction bearing devices interposed between said complementary raceways, said tubular means being interposed between and engaging said shackle links for spacing the same apart, and means extending through said tubular means for connecting said shackle links together so spaced apart.

2. In a spring shackle construction, a pair of shackle links having bearing raceway sustaining portions at spaced points thereon, bearing raceway members thereon, tubular means to be carried by a spring, tubular means to be carried by a frame, said tubular means having raceways for anti-friction bearing devices complementary to said first mentioned raceways carried by said shackle links, anti-friction bearing devices interposed between said complementary raceways, said tubular means being interposed between and engaging said raceways carried by said shackle links for spacing the latter and said raceways apart, and means extending through said tubular means for connecting said shackle links to each other so spaced apart.

3. In a spring connection, a member having an eye therein, tubular means carried by said eye and having raceways for anti-friction bearing devices at opposite sides of said eye, anti-friction bearing devices on said raceways, a pair of bearing members having raceways complementary to said first mentioned raceways and engaging said anti-friction bearing devices, said tubular means being in engagement with said bearing members to space the same apart, and a through bolt extending through said tubular means for securing said bearing members to each other.

4. In a spring connection, a member having an eye therein, tubular means carried by said eye and having raceways for anti-friction bearing devices at opposite sides of said eye, anti-friction bearing devices on said raceways, a pair of bearing members having raceways complementary to said first mentioned raceways and engaging said anti-friction bearing devices, said tubular means being in engagement with said bearing members to space the same apart, and means for resiliently connecting said bearing members to each other for securing said bearing members to each other.

JOHN W. SMITH.